(12) United States Patent
Viohl

(10) Patent No.: US 11,850,939 B2
(45) Date of Patent: Dec. 26, 2023

(54) STEERING COLUMN ASSEMBLY MODULE HAVING AN OPERATING DEVICE FOR SETTING AN OPERATING PARAMETER OF A MOTOR VEHICLE, AND MOTOR VEHICLE COMPRISING SUCH A STEERING COLUMN ASSEMBLY MODULE

(71) Applicant: Volkswagen Aktiengesellschaft, Wolfsburg (DE)

(72) Inventor: Arne Viohl, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 17/773,885

(22) PCT Filed: Oct. 5, 2020

(86) PCT No.: PCT/EP2020/077779
§ 371 (c)(1),
(2) Date: May 3, 2022

(87) PCT Pub. No.: WO2021/089256
PCT Pub. Date: May 14, 2021

(65) Prior Publication Data
US 2022/0371437 A1 Nov. 24, 2022

(30) Foreign Application Priority Data
Nov. 5, 2019 (DE) ..................... 10 2019 217 016.1

(51) Int. Cl.
*B60K 20/06* (2006.01)
*B60Q 3/283* (2017.01)
*G05G 5/05* (2006.01)

(52) U.S. Cl.
CPC .............. *B60K 20/06* (2013.01); *B60Q 3/283* (2017.02); *G05G 5/05* (2013.01)

(58) Field of Classification Search
CPC ......... G05G 5/05; B60K 20/06; B60Q 1/1469
See application file for complete search history.

(56) References Cited

U.S. PATENT DOCUMENTS 3,461,256 A  8/1969  Ferryman, Jr. ............ 200/61.88
3,760,651 A * 9/1973  Roseby ............... F16H 59/0278
                                              74/543

(Continued)

FOREIGN PATENT DOCUMENTS

DE  19922500 A1  11/2000  ............... B60Q 1/14
DE  19958507 A1   6/2001  ............... B60Q 1/14

(Continued)

OTHER PUBLICATIONS

German Office Action, Application No. 102019217016.1, 6 pages, dated Aug. 5, 2020.

(Continued)

*Primary Examiner* — Thomas C Diaz
(74) *Attorney, Agent, or Firm* — Slayden Grubert Beard PLLC

(57) ABSTRACT

A steering column assembly module having an operating device for setting an operating parameter of a motor vehicle comprises a static central element that annularly surrounds a steering axis, and a recess, and has an elongated rotary element with a longitudinal axis, and comprises a grip section, and a bearing section that is fixedly connected to the grip section. In this context, the bearing section of the rotary element is disposed in the recess of the central element at least sectionally, and is mounted in the central element rotatably about the longitudinal axis, wherein a rotation sensor is configured to detect a rotational position of the rotary element, and in dependence upon the detected rota- (Continued)

tional position, to generate a control signal for setting the operating parameter.

15 Claims, 1 Drawing Sheet

(56) References Cited

U.S. PATENT DOCUMENTS

| | | | | |
|---|---|---|---|---|
| 3,901,097 | A | * | 8/1975 | Williams .......... B60R 25/02144 74/504 |
| 4,387,279 | A | | 6/1983 | Brevick ...................... 200/61.54 |
| 5,156,243 | A | * | 10/1992 | Aoki ...................... B60K 37/06 200/61.54 |
| 5,442,974 | A | * | 8/1995 | Sugimoto .............. B60K 37/06 74/335 |
| 6,462,289 | B1 | | 10/2002 | Kubota ....................... 200/61.54 |
| 6,891,115 | B2 | | 5/2005 | Rudolph et al. ........... 200/61.54 |
| 7,029,420 | B2 | * | 4/2006 | Sekino ................... F16H 61/22 477/99 |
| 8,269,122 | B2 | | 9/2012 | Kimura et al. ............ 200/61.54 |
| 2009/0294267 | A1 | * | 12/2009 | Misaka ................ B60Q 1/1476 200/336 |

FOREIGN PATENT DOCUMENTS

| | | | | |
|---|---|---|---|---|
| DE | 102006057571 | A1 | 6/2008 | ............. B60R 16/02 |
| DE | 102005012051 | B4 | 12/2010 | ............. B60K 37/06 |
| DE | 102012011709 | A1 | 12/2013 | ............. B60R 16/02 |
| DE | 102014117885 | A1 | 6/2015 | ............... G05G 1/08 |
| DE | 102014101181 | A1 | 8/2015 | ............. B60K 20/02 |
| DE | 102019217016 | A1 | 5/2021 | ................ B60Q 1/26 |
| WO | WO-0202969 | A1 * | 1/2002 | ......... F16H 59/0204 |
| WO | 2021/089256 | A1 | 5/2021 | ............. B60K 35/00 |

OTHER PUBLICATIONS

International Search Report and Written Opinion, Application No. PCT/EP2020/077779, 8 pages, dated Jan. 18, 2021.

* cited by examiner

STEERING COLUMN ASSEMBLY MODULE HAVING AN OPERATING DEVICE FOR SETTING AN OPERATING PARAMETER OF A MOTOR VEHICLE, AND MOTOR VEHICLE COMPRISING SUCH A STEERING COLUMN ASSEMBLY MODULE

CROSS-REFERENCE TO RELATED APPLICATIONS

This application claims priority to German Patent Application No. DE 10 2019 217 016.1, filed Nov. 5, 2019 with the German Patent and Trademark Office. The contents of the aforesaid patent application are incorporated herein for all purposes.

TECHNICAL FIELD

The present invention relates to a steering column assembly module having an operating device for setting an operating parameter of a motor vehicle. The steering column assembly module comprises a static central element that annularly surrounds a steering axis and has a recess, as well as a rotary element that is elongated in form with a longitudinal axis and has a grip section, and a bearing section fixedly connected to the grip section. The invention further relates to a motor vehicle comprising such a steering column assembly module.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In the construction of modern motor vehicles, it is often provided that between a dashboard and a steering wheel, a stationary part is disposed wherein, for example, steering column assembly switches, an ignition lock, and if applicable, electronic control devices, are disposed. These are usually consolidated into an integrated assembly as a steering column module. In known steering column assembly switches, for example, a pivotably mounted lever is used, through the actuation of which certain functions of the motor vehicle can be controlled, such as for example a turning signal, windshield wipers, or an automatic speed control. Moreover, switches and adjusters disposed on a lever can be used to set parameters.

In this context, very precise manufacturing with low clearances is required to ensure proper functioning. Moreover, too many operating options on a single lever can mean that the individual control elements are small, and are disposed such that they are difficult for the user to reach or to recognize.

SUMMARY

A need exists to provide a steering column assembly module and a motor vehicle of the type mentioned at the outset that can be operated particularly reliably and can be constructed particularly simply.

The need is addressed by a steering column assembly (module) according to the independent claims. Embodiments of the invention are described in the dependent claims, the following description, and the drawings.

DESCRIPTION

Figure 1:
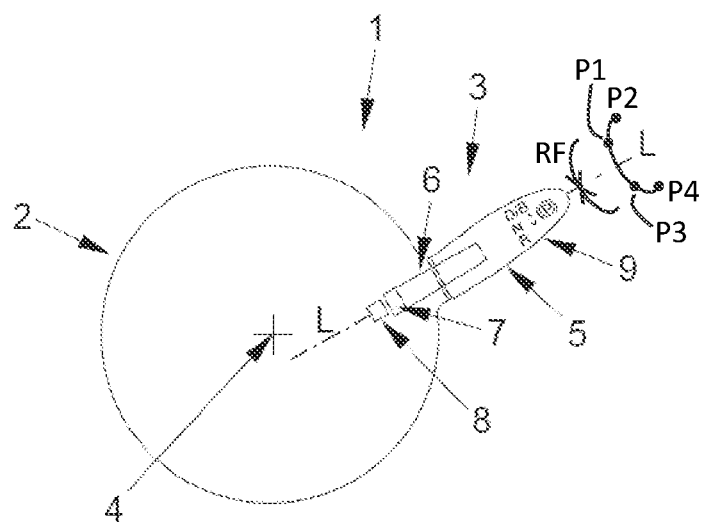
FIG. 1 shows a first exemplary embodiment of the steering column assembly module.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a steering column assembly module having an operating device for setting an operating parameter of a motor vehicle comprises a static central element that annularly surrounds a steering axis and has a recess. It further comprises a rotary element that is elongated in form with a longitudinal axis, and a grip section, and a bearing section that is fixedly connected to the grip section. The bearing section of the rotary element is disposed at least sectionally in the recess of the central element, and is mounted in the central element rotatably about the longitudinal axis. In this context, a rotation sensor is configured to detect a rotational position of the rotary element, and in dependence upon the detected rotational position, to generate a control signal for setting the operating parameter.

This makes operation particularly easy, since the grip surface is simple for a user to grasp. Therefore, a tangible haptic feedback can be detected by the user during operation. Furthermore, manufacturing tolerances can be dimensioned relatively generously in manufacturing the steering column module, since the bearing section is mounted inside the central element, whereas mounting outside, such as among known steering column assembly switches, necessitates visible connection and bearing points and very low tolerances.

In particular, the entire steering column assembly switch or respectively the entire rotary element arranged on the central element can be rotated, not just a part thereof. Therefore, the control element can be designed to be particularly easy to grasp and operate, since the user does not have to specifically grasp a small, rotatable section, but rather only has to grasp any given point.

Within the context of the teachings herein, particularly the stationary part of a mechanical steering between the dashboard and steering wheel is described as the "steering column assembly". Steering column assembly switches, etc. can be disposed thereon. With regard to the teachings herein, a "central region" is defined that surrounds the steering axis, which particularly is defined as a longitudinal axis of a steering column of the vehicle. This means, the steering column extends through the central region, which is annularly formed. In this context, "annular" is not limited to a circular course, however the central region is essentially formed so that its outer limit is formed along an essentially circular or oval course. Attached parts such as steering column assembly switches or other projecting elements do not belong to the central region in this sense, but rather one-part or multi-part additional elements of the steering column assembly connected thereto are elements of the steering column assembly.

A "steering column assembly module" in the context of the teachings herein is an assembly or other unit that comprises the essential parts of the steering column assembly, i.e., at least the central element. It can further comprise attached parts, such as steering column assembly switches or levers in some embodiments. Additional elements can be formed as a single part with the central region, or in the case of a multi-part structure of the steering column assembly module, can be permanently or detachably connected to the central region.

With regard to the teachings herein, the rotary element is elongated in form and mounted rotatably about its longitudinal axis. In this context, the longitudinal axis is an axis along a longitudinal extension of the rotary element, wherein the longitudinal extension is particularly at least twice the extension in another direction perpendicular thereto. The grip section and the bearing section are particularly both disposed and oriented along the longitudinal axis, and can merge into one another or respectively directly border on one another.

The grip section of the rotary element is formed so that the user can reach and actuate it with one hand. It is particularly suitable for being grasped by the user and is formed so that the user can exert a force for rotating the rotary element about the longitudinal axis. For example, the grip section comprises a flattened region.

The bearing section of the rotary element is formed so that it can be mounted in the central element, particularly is formed on a pivot bearing that is stationary relative to the central element, said pivot bearing being formed in the known manner.

In some embodiments of the steering column assembly module, the grip section of the rotary element essentially comprises the entire part of the rotary element that is visible to a user and, if applicable, can be grasped with one hand. In this manner the entire part of the rotating element that can be seen and reached by the user can be operated.

Furthermore, the user can detect which rotational position the rotary element is currently in based on a position of the visible part. Particularly the bearing section that is mounted in the central element is formed concealed from the user so that the user cannot see or reach this section during intended operation.

The recess of the central element can be formed in various ways. It can comprise an opening, etc. through which the bearing section runs. Furthermore, it can be formed in the manner of a blind hole or an indentation, wherein in this case as well, an opening is provided on a side of the central element facing away from the steering axis. The bearing section of the rotary element is disposed in the recess at least sectionally, particularly in that it extends through the opening.

In some embodiments, the bearing element moves relative to an inner surface of the recess upon rotation of the rotary element. The rotary element is therefore mounted so that upon actuation, it moves relative to the central element through rotation. The rotation of the rotary element is transmitted thereby into the inner region of the central element, where particularly the bearing is disposed and the detection takes place by the rotation sensor.

In some embodiments, the rotation sensor is disposed in the central element. Beneficially, this makes comparatively more installation space available for the sensor, while when housing the sensor within a lever, etc., only limited installation space is enabled.

The rotation sensor is formed in a manner known per se. The rotation sensor is suitable for detecting the rotational position of the rotary element or respectively of an element thereof, such as the bearing section. It can comprise a Hall sensor, for example, through which a position of a magnetic element on the rotary element is detected. In this context, the rotation sensor can be disposed on the rotary element, and comprise an element that rotates relative to the central element upon rotation of the rotary element. Conversely, the rotation sensor can be disposed fixedly relative to the central element, and can be configured to detect a rotational change in position of an element of the rotary element.

In some embodiments, the recess is formed in a trim of the central element, wherein the trim comprises an additional recess in which the rotary element is arranged, at least sectionally. A section of the rotary element that is disposed in the recess of the central element can be concealed thereby so that the installation can proceed more simply and, for example, more generous clearances can be provided than in an arrangement visible from the outside.

In some embodiments, adjacent to the recess, the grip section of the rotary element comprises a transition region to the bearing section, wherein an edge is formed in the transition region. The edge can have a rectangular course, for example. Beneficially, this enables it to define a rotation plane between the rotatably movable grip piece and the static central element. Furthermore, a boundary of the recess of the central element can be covered by the edge, which in turn enables more generous production tolerances.

In some embodiments, the rotary element is mounted in the central element so that the rotary element is held in a neutral position by a return force. Thereby the position of the rotary element can be temporarily adjusted about the neutral position, wherein the rotary element returns to a known and well-visible position after being operated.

For example, the neutral position is defined by a rotation angle of 0°. The rotary element is then particularly pivoted over a further rotation angle out of the neutral position through loading with a force, and this rotation angle or respectively its change is detected by the rotation sensor.

In some embodiments, the rotary element is mounted in the central element so that upon rotation of the rotary element, four pressure points further arise; wherein respectively two pressure points are formed in a first rotation direction, and in a second rotation direction that is opposite to the first rotation direction. Operation can thereby take place particularly simply, and through haptic feedback, in an easily detectable manner.

The pressure points are particularly defined by certain rotation angles. A certain force is required to move the rotary element to the rotation angle of the pressure point, and the pressure point can only be exceeded when a greater force is applied. The function of the force to be applied has a local maximum at the pressure point in dependence upon the rotation angle. Furthermore, a pressure point can be an end point or a stop of a rotational movement capability of the rotary element, so that the rotary element cannot be rotated beyond the pressure point during intended use.

The pressure points are particularly disposed symmetrically about the neutral position, i.e., starting from the neutral position, the rotary element can be rotated in opposite directions, wherein the same number of pressure points is passed in each direction. For example, three levels can be set for the operating parameter, and each of the three levels can be reached directly by pivoting the rotary element out of the neutral position when a switchover to a different level takes place upon reaching every pressure point or stop point.

Different numbers of pressure points can be provided in further embodiments. For example, two to six pressure points can be provided aside from the neutral position. Furthermore, an asymmetrical arrangement of the pressure points about the neutral position can be provided.

In some embodiments, the grip section of the rotary element comprises an output region for outputting the currently set operating parameter. The user can thereby directly detect which setting is currently active, and a new parameter can be set easily. The output region can be formed in various ways.

In some embodiments, the output region comprises at least one illuminable output element that indicates the currently set operating parameter. This enables particularly simple and rapid detection.

The illuminable output element can be back-illuminated, for example, wherein a light-permeable surface, such as in the form of a graphic representation, is illuminated by a light source disposed behind it. The illuminable output element can be formed so that the light source in the activated state is not directly visible to a user, but rather is merely indirectly visible through the illuminated surface. The light-permeable surface can be formed particularly so that in the switched-off state, it is not visible to an observer (dark panel effect). Furthermore, the illuminable output element can be formed by means of a matrix of light sources, such as in a display surface, or the light source can be directly visible, such as in a glowing point, in order to illuminate one position along a scale.

In some embodiments, at least one static output element that relates to a settable operating parameter is arranged in the output region. Beneficially, the user can thereby detect which operating parameters can be set, even if they are not currently set.

The static output element can be formed so that it is continuously visible. For this purpose, it can be formed so as to be visible without active illumination, such as in a surface in the output region of the rotary element, or it can be continuously illuminated. For example, the static output element can be illuminated with light of a first color and/or intensity when it does not currently represent an active operating parameter, and it can be illuminated with a second color and/or a second intensity when it currently represents an active operating parameter.

In some embodiments, one static output element is respectively arranged for each settable operating parameter, or respectively for each settable value of the operating parameter. In this case the user can continuously detect the settable parameters and values. Furthermore, the output region can comprise a dynamic display element that displays the currently set operating parameter; this dynamic display element can replace the static display element for the settable operating parameter, such as in that the dynamic instead of the static display element is output, or it can be output in addition to the static display element.

In some embodiments, the operating parameter is a gear selection of the vehicle. Beneficially, a particularly central operating parameter can thereby be set in a simple manner.

In particular, they are gear selections of an automatic transmission of the motor vehicle. Settable gear selections can be a reverse gear, forward gear, and a neutral position or respectively an idle. Static output elements in particular are provided for each of the settable gear selections.

The output region is arranged particularly so that it is visible to a user on a driver seat of the motor vehicle. The arrangement is formed particularly so that the output region is visible in the neutral position through openings of a steering wheel.

In some embodiments, a pushbutton switch is disposed on an end of the rotary element facing away from the central element. The user can reach the switch particularly easily thereby.

The pushbutton switch can be formed as a p-key, for example, for activating a parking state. An emergency braking of the motor vehicle can be triggered particularly by actuation of the pushbutton switch. In this context, the motor vehicle can undergo a significant deceleration, such that the rotary element is exposed to strong forces.

In some embodiments, the rotary element is formed and is mounted in the central element in such a manner that the rotary element has a fracture strength of at least 500 N, for example at least 800 N. The rotary element can thereby be prevented from breaking in the event of a strong deceleration.

When emergency braking is triggered by actuation of a switch, breakage of the rotary element and, if applicable, interruption of the electrical circuit, would result in the braking being released again. This can be prevented in that the rotary element is formed with high fracture strength. In this context, the value for the fracture strength relates particularly to a value of a force that is applied to the end of the rotary element facing away from the central element. This means, a fracture only occurs above a certain threshold value, particularly at least 500 N, for example at least 800 N.

In some embodiments, the steering column assembly module further comprises a lever that is rotatably mounted about the steering axis. Furthermore, at least one steering column assembly switch can be provided. A turning signal, a windshield wiper or a driver assistance system, for example, can be operated by means of the lever or another switch.

The vehicle according to the teachings herein comprises a steering column assembly module according to the preceding description. It therefore exhibits the same benefits as the discussed steering column assembly module.

The steering column assembly module is particularly disposed on the steering column of the vehicle, particularly behind the steering wheel of the vehicle.

The invention will now be explained based on further exemplary embodiments with reference to the drawings.

Specific references to components, process steps, and other elements are not intended to be limiting. Further, it is understood that like parts bear the same or similar reference numerals when referring to alternate FIGS.

A first exemplary embodiment of the steering column assembly module will be explained with reference to FIG. 1.

The steering column assembly module 1 is disposed in a vehicle (not shown) between a dashboard and a steering wheel. It comprises a central element 2 that annularly surrounds a rotation axis 4, as well as a rotary element 3. The rotary element comprises a grip section 5 and a bearing section 6. Furthermore, it is elongated in form and has a longitudinal axis L that is essentially disposed radially to the steering axis 4 or respectively parallel to a corresponding radial direction. The grip section therefore projects outward from the central element 2, and is disposed visible to a user and reachable for his hand. The central element 2 comprises a recess. The bearing section 6 is disposed at least sectionally in the recess of the central element 2. It is rotatably mounted in the central element 2 about the latter's longitudinal axis L. Therefore upon rotation of the rotary element 3, the bearing section 6 moves relative to an inner surface of the recess. The longitudinal axis L of the rotary element 3 runs essentially radially to the steering axis 4 or respectively parallel to a radial axis.

In the exemplary embodiment, the recess of the central element 2 comprises an opening of the central element 2 through which the bearing section 6 extends. In further exemplary embodiments, the recess is formed as an indentation in the central element 2 that comprises an outward-facing opening, and a termination surface, wherein particularly bearing elements for mounting the bearing section 6 are arranged on this termination surface.

Static output elements 9 are disposed on the surface of the rotary element 3, and facing toward the user. In this context in the exemplary embodiment, they are graphic symbols printed on the surface that are assigned to the various gear selections of an automatic transmission of the vehicle. The static output elements 9 are furthermore formed so as to be individually back-illuminable, i.e. light sources disposed in the inside of the grip section 5 can respectively illuminate one of the static output elements 9. In the exemplary embodiment, the static output element 9 that is assigned to the currently activated gear selection is respectively back-illuminated.

A magnet element 7 is disposed on the end of the bearing section 6 projecting into the central element 2, and is connected in a rotationally secured manner to the bearing section. Furthermore, a rotation sensor 8 fixedly connected to the central element 2 is disposed in the vicinity of the magnet element 7, in the exemplary embodiment with a Hall sensor, that detects the situation of the magnet element 7 and particularly detects a change in situation of the magnet element 7, and a change resulting therefrom in the magnetic field. In dependence upon the detected situation or respectively change in situation, a control signal is generated by a control unit (not shown) for setting the gear selection of the automatic transmission.

In the exemplary embodiment, the bearing section of the rotary element 3 is mounted so that at a certain rotation angle a neutral position of the rotary element 3 is defined. This means that if the rotary element 3 is not loaded with an external force, it is returned to the neutral position by a return force indicated by arrow RF. Furthermore, due to the bearing, pressure points indicated at P1-P4 are defined at certain angles of rotation. This means that if the rotary element 3 is loaded with a force so that it is pivoted out of the neutral position through rotation, a higher force must be applied for rotation in the vicinity of the pressure points P1-P4 than outside of the vicinity. Furthermore, stop points are defined at further angles of rotation, beyond which no further rotation of the rotary element 3 can occur.

In the exemplary embodiment, the mounting is done so that the rotary element 3, upon being pivoted out of the neutral position in a first direction, reaches a first pressure point P1, and then a first stop point, i.e., a second pressure point P2. Equally upon being pivoted into a second, opposite direction, first a second third pressure point P3, and then a second stop point, i.e., a fourth pressure point P4, are reached. Upon reaching the pressure- and stop points, a control signal is respectively generated for changing the selected gear selection. Therefore, starting from the neutral position, two changes in the gear selection can be performed sequentially, wherein the gear selections are switched through in the sequence indicated by the static output elements 9. The sequence of switching is determined depending on the direction in which the rotary element 3 is pivoted. Starting from each of the three gear selections "D/B", "N" and "R", the user can therefore reach respectively one other gear selection, in this or the opposite sequence.

In the exemplary embodiment, the rotary element 3 is further formed and mounted so that it has a fracture strength of at least 500 N, i.e. the end projecting out of the central element 2 must be loaded with at least 500 N to break it off of it. In another exemplary embodiment, a fracture strength of at least 800 N is achieved.

Figure 2:
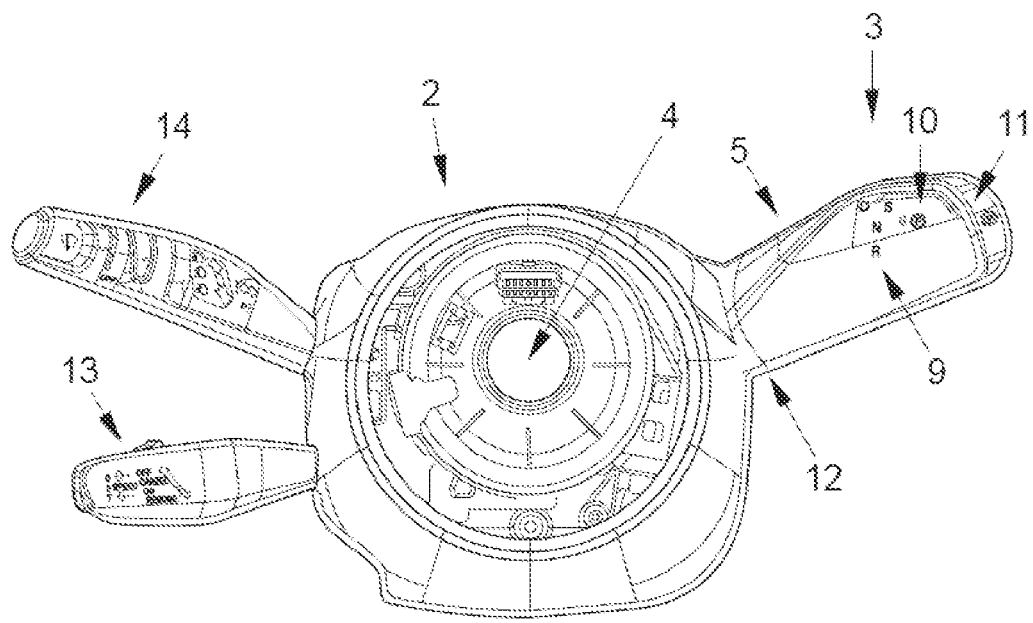
FIG. 2 shows a second exemplary embodiment of the steering column assembly module.

A second exemplary embodiment of the steering column assembly module will be explained with reference to FIG. 2. In this context, elements that structurally and/or functionally correspond to similar elements of the first exemplary embodiment are assigned the same reference symbols and not described in detail again.

In the second exemplary embodiment, the steering column assembly module 1 also comprises a central element 2 as well as a rotary element 3 having a grip section 5, and a bearing section 6. The bearing section 6 runs through a recess of the central element and is rotatably mounted. A rotary surface 12 is formed between the grip section 5 and the central element 2. The rotary surface 12 is defined here by a gap between the central element 2, and an edge that is formed at a right angle on the transition of the grip section 5 to the bearing section 6.

A pushbutton switch 11 is provided on the end of the rotary element 3 that is facing away from the central element 2. This serves for operating a parking brake as well as for triggering emergency braking while the vehicle is in motion. A static output element 10 for the parking display is further disposed on the surface of the grip section 5 next to the static output elements 9 for the gear selection display. This is provided with a printed-on graphic element so that it is continuously visible, and is back-illuminated while the parking brake is activated. In the exemplary embodiment, this back-illumination takes place with a color that is different from the back-illumination of the output element 9 for the gear selection display, particularly red.

The steering column assembly module 1 according to the second exemplary embodiment further comprises two steering column assembly switches 13, 14 that are pivotably mounted in the manner known per se relative to the central element 2, and serve for controlling a turning signal and a windshield wiper system.

In another exemplary embodiment, a trim element is further provided that is arranged around the central element 2. In this case, the trim element also comprises a recess through which the rotary element 3 runs, and into which the central element 2 projects. In the exemplary embodiment, the rotary surface 12 is disposed so that it lies between the central element 2 and the trim element. In other exemplary embodiments, the rotary surface can lie outside the trim element. However, it is provided that essentially the entire elongated structure, which projects away from the central element 2 in the region of the rotary element 3, is comprised by the rotary element 3. This means that the rotary element 3 essentially attaches directly to the central element 2, and is not disposed on a static element going out from the central element 2. The section of the rotary element 3 that is visible to a user from outside and reachable with a hand is rotatable in its entirety.

LIST OF REFERENCE NUMERALS

1 Steering column assembly module
2 Central element

3 Rotary element
4 Steering axis
5 Grip section
6 Bearing section
7 Magnet element
8 Rotation sensor
9 Static output element; gear selection display
10 Static output element; parking display
11 Pushbutton switch
12 Rotary surface
13 Steering column assembly switch
14 Steering column assembly switch
L Longitudinal axis The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module, or other unit or device may fulfil the functions of several items recited in the claims.

The term "exemplary" used throughout the specification means "serving as an example, instance, or exemplification" and does not mean "preferred" or "having advantages" over other embodiments. The terms "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A steering column assembly having an operating device for selecting and setting a transmission gear of a motor vehicle, comprising:
   a static central element that annularly surrounds a steering axis, the static central element having an annular outer circumference in a plane perpendicular to the steering axis;
   a recess within the annular outer circumference of the static central element; and
   an elongated rotary element with a longitudinal axis, and a grip section, and a bearing section that is fixedly connected to the grip section;
   wherein the bearing section of the rotary element is disposed in the recess within the annular outer circumference of the static central and allows rotation of the rotary element about the longitudinal axis;
   wherein a rotation sensor is configured to detect a rotational position of the rotary element, and in dependence upon the detected rotational position of the rotary element, to generate a control signal for setting a transmission gear corresponding with the detected rotational position of the rotary element;
   wherein the grip section of the rotary element rotates along with the bearing section about the longitudinal axis; and
   wherein the grip section comprises an output region to display the transmission gear associated with the detected rotational position of the rotary element.

2. The steering column assembly of claim 1, wherein the grip section of the rotary element is located outside the static central element.

3. The steering column assembly of claim 1, wherein the bearing section moves relative to an inner surface of the recess within the annular outer circumference of the static central element during a rotation of the rotary element.

4. The steering column assembly of claim 1, wherein the rotation sensor is disposed in the static central element.

5. The steering column assembly of claim 1,
   wherein the grip section of the rotary element comprises a transition region to the bearing section adjacent to the recess within the annular outer circumference of the static central element;
   wherein an edge is formed in the transition region.

6. The steering column assembly of claim 1, wherein the rotary element is mounted in the static central element so that the rotary element is held in a neutral position by a return force.

7. The steering column assembly of claim 6, wherein the rotary element is mounted in the static central element so that when the rotary element is rotated, four pressure points further arise; wherein respectively two pressure points are formed in a first rotation direction, and in a second rotation direction that is opposite to the first rotation direction.

8. The steering column assembly of claim 1, wherein the output region comprises at least one illuminable output element that indicates the transmission gear associated with the detected rotational position of the rotary element.

9. The steering column assembly of claim 1, wherein the output region includes at least one static output element that indicates the transmission gear associated with the detected rotational position of the rotary element.

10. The steering column assembly of claim 1, wherein a pushbutton switch is disposed on an end of the rotary element facing away from the static central element.

11. A vehicle having a steering column assembly with an operating device for selecting and setting a transmission gear of a motor vehicle, comprising:
    a static central element that annularly surrounds a steering axis, the static central element having an annular outer circumference in a plane perpendicular to the steering axis;
    a recess within the annular outer circumference of the static central element; and
    an elongated rotary element with a longitudinal axis, and a grip section, and a bearing section that is fixedly connected to the grip section;
    wherein the bearing section of the rotary element is disposed in the recess within the annular outer circumference of the static central and allows rotation of the rotary element about the longitudinal axis;
    wherein a rotation sensor is configured to detect a rotational position of the rotary element, and in dependence upon the detected rotational position of the rotary element, to generate a control signal for setting a transmission gear corresponding with the detected rotational position of the rotary element;
    wherein the grip section of the rotary element rotates along with the bearing section about the longitudinal axis; and
    wherein the grip section comprises an output region to display the transmission gear associated with the detected rotational position of the rotary element.

12. The vehicle of claim 11, wherein the bearing section moves relative to an inner surface of the recess within the annular outer circumference of the static central element during a rotation of the rotary element.

13. The vehicle of claim 11, wherein the rotation sensor is disposed in the static central element.

14. The vehicle of claim 11, wherein the output region comprises at least one illuminable output element that indicates the transmission gear associated with the detected rotational position of the rotary element.

15. The vehicle of claim 11, wherein the output region includes at least one static output element that indicates the transmission gear associated with the detected rotational position of the rotary element.

* * * * *